Jan. 24, 1956   G. C. LUTHER   2,732,014
CUTTING MACHINE HAVING ROTATABLE COMPLEMENTAL CUTTERS
ADJUSTABLY MOUNTED IN BEARING ELEMENTS
Filed May 14, 1951   3 Sheets-Sheet 1

INVENTOR.
GLENN C. LUTHER
BY
J. H. Braddock
ATTORNEY.

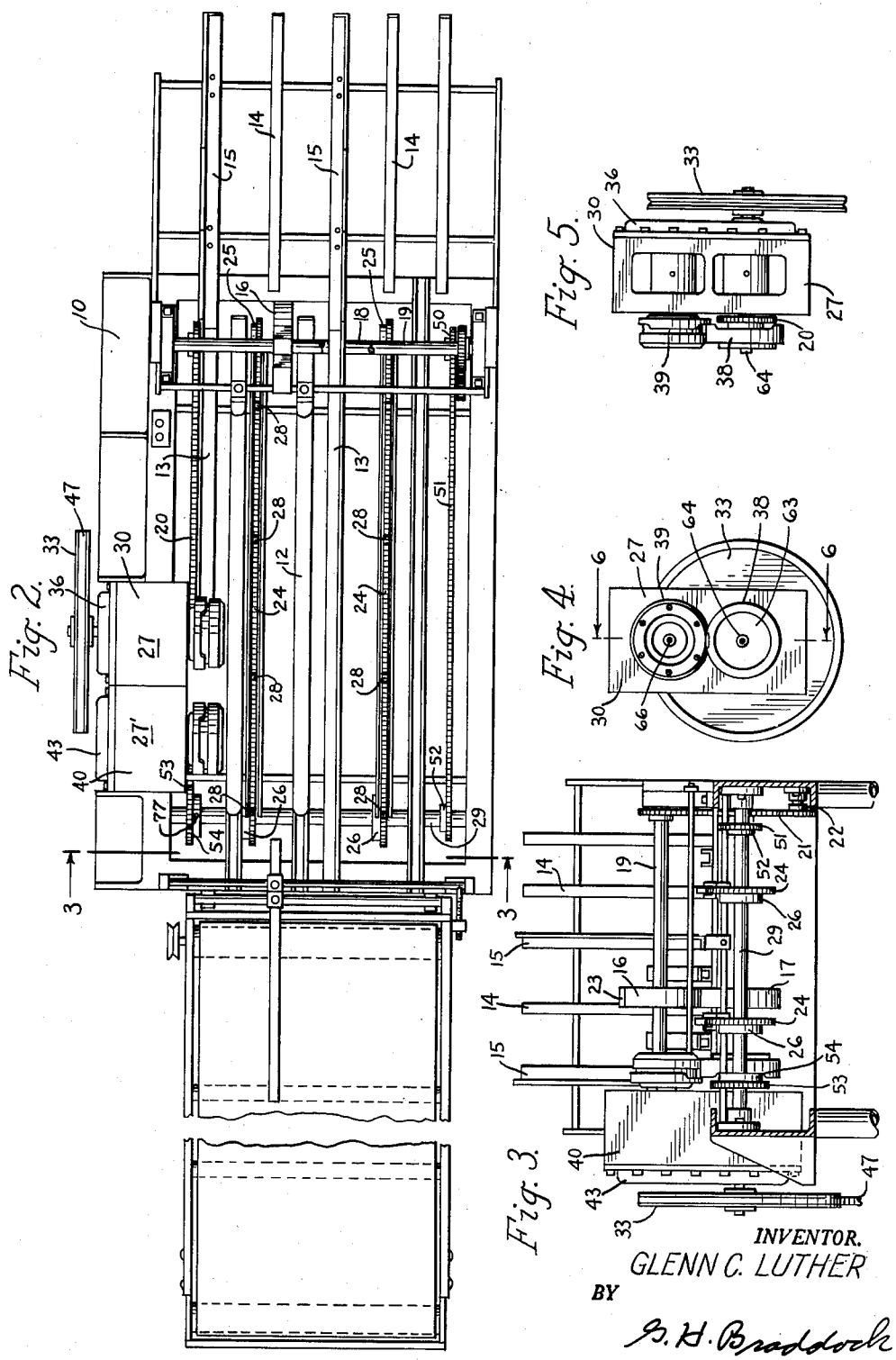

Jan. 24, 1956  G. C. LUTHER  2,732,014
CUTTING MACHINE HAVING ROTATABLE COMPLEMENTAL CUTTERS
ADJUSTABLY MOUNTED IN BEARING ELEMENTS
Filed May 14, 1951  3 Sheets-Sheet 3
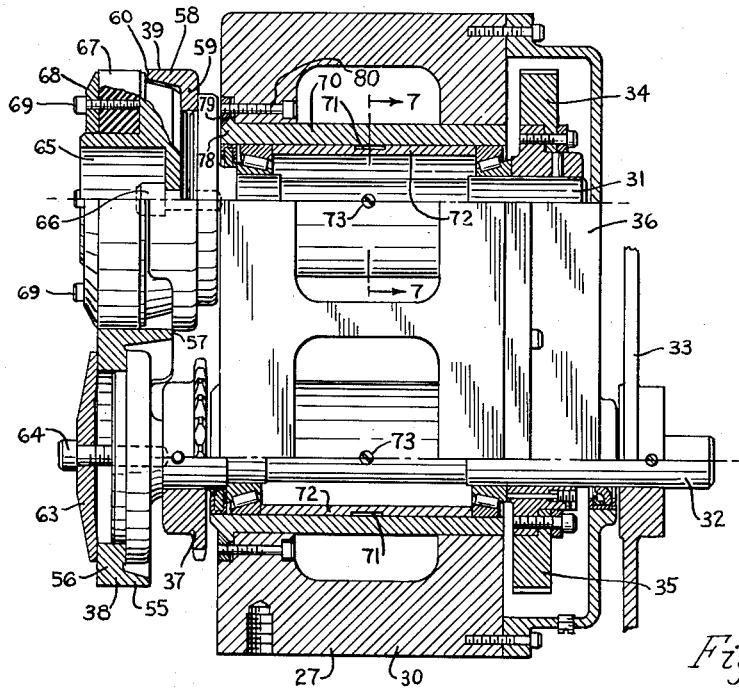
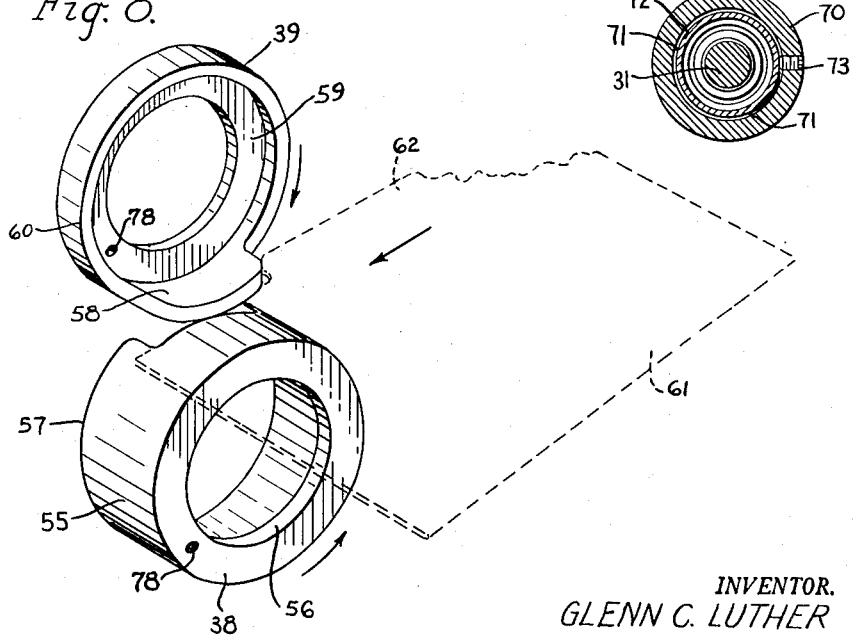
INVENTOR.
GLENN C. LUTHER
BY
*G. H. Braddock*
ATTORNEY.

United States Patent Office 2,732,014
Patented Jan. 24, 1956

2,732,014

CUTTING MACHINE HAVING ROTATABLE COMPLEMENTAL CUTTERS ADJUSTABLY MOUNTED IN BEARING ELEMENTS

Glenn C. Luther, Brooklyn Center, Minn., assignor to The Olm Company, Minneapolis, Minn., a copartnership Application May 14, 1951, Serial No. 226,248

3 Claims. (Cl. 164—61)

The invention herein presents a machine for cutting paper, or other materials.

Although useful for various purposes, the machine has been devised to be especially useful for the purpose of producing file folder tabs in the art of manufacturing file folders.

An object of the invention is to provide a machine for producing tabs of file folders, filing guides, etc., which will be an improvement generally over machines for the same purpose heretofore known.

In the accompanying drawings forming a part of this specification,

Fig. 2 is a top plan view of the machine of Fig. 1;

Fig. 3 is a vertical transverse sectional view, taken on line 3—3 in Fig. 2;

Fig. 4 is a front elevational view of a paper cutting unit of the machine;

Fig. 5 is a side elevational view of the unit of Fig. 4 as it would appear from the right;

Fig. 6 is a detail sectional view, taken on line 6—6 in Fig. 4;

Fig. 7 is a detail sectional view, taken as on line 7—7 in Fig. 6; and

Fig. 8 is a diagrammatic view illustrative of the manner in which complementary annular die cutters of the machine are operative.

Figure 1:
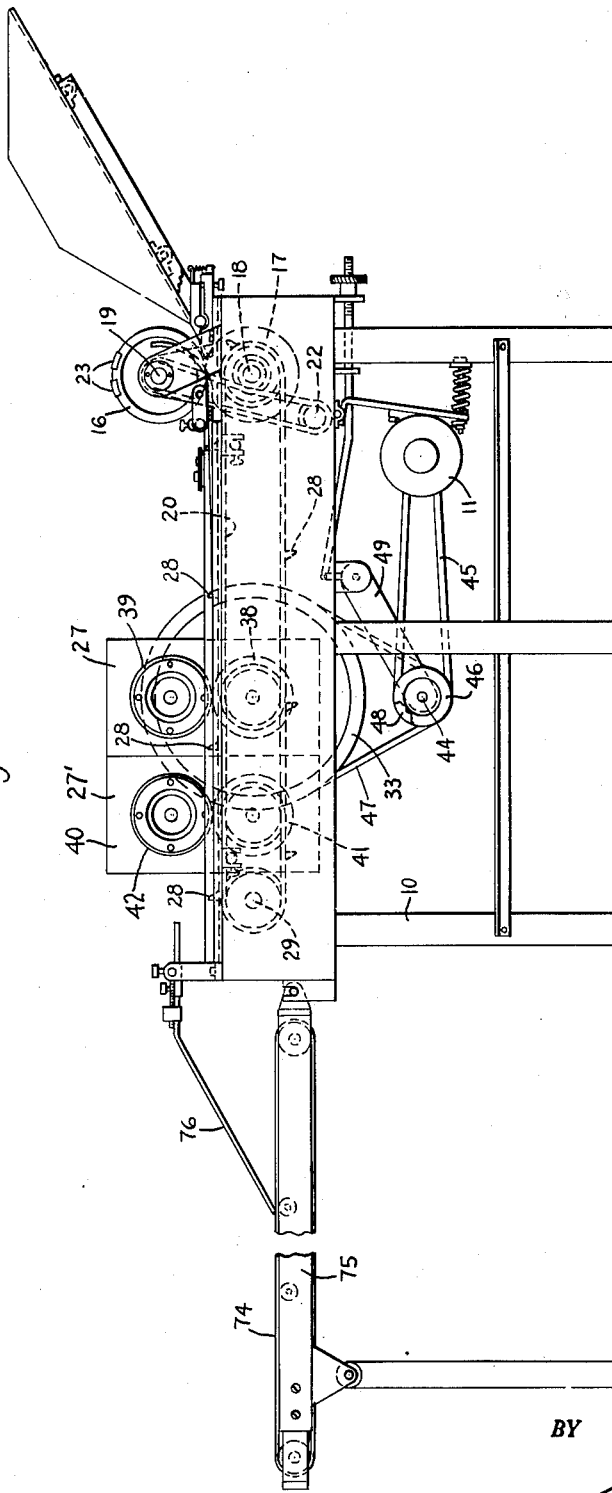
Fig. 1 is a side elevational view of a machine for producing tabs of file folders incorporating the features and characteristics of the invention.

With respect to the drawings and the numerals of reference thereon, 10 denotes a frame of the machine supporting an electric motor 11 situated below bars 12 and angle pieces 13 of said frame extending longitudinally of the machine. Together, the bars 12 and angle pieces 13 constitute a horizontal platform, and said angle pieces are guide elements at opposite sides of the horizontal platform.

An oblique platform, for sheets of paper, such, for example, as file folders, to be fed forwardly in the machine, consists of longitudinal bars 14 and angle pieces 15. As will be clear from Fig. 2, the angle pieces 13 and 15 are in alinement longitudinally of the machine. The angle pieces 15 are guide elements at the opposite sides of the oblique platform.

Sheets of paper, or other material, are fed by gravity to upper and lower feed rollers 16 and 17. The lower feed roller 17 is fixed on a transverse shaft 18 suitably and conveniently mounted on the machine frame, and the upper feed roller 16 is fixed on a transverse shaft 19 also suitably and conveniently mounted on said machine frame. The shaft 18 is driven by a chain drive 20, and the shaft 19 is driven by a chain drive 21 itself driven from the shaft 18 and riding an idler pulley 22. See Figs. 1, 2 and 3. Inserts 23 in the upper feed roller 16 are for facilitating removal of individual sheets from the oblique platform.

The upper and lower feed rollers 16 and 17 deposit the individual sheets on the horizontal platform. Longitudinal chains 24, mounted on sprocket wheels 25, 26, are for advancing the individual sheets to rotatable, complementary annular die cutters of one or more paper cutting units, denoted 27 and 27', respectively, of the machine. Spaced lugs 28 rigid with each chain 24 and projecting above the horizontal platform successively engage the rear edges of the successive sheets thus to feed them to the die cutters while being guided by oppositely facing angle pieces 13, 13. The sprocket wheels 25 are fixed on the transverse shaft 18 and the sprocket wheels 26 are freely rotatable on a transverse shaft 29 suitably and conveniently mounted on the machine frame.

The paper cutting unit 27 includes a bearing member 30 mounted on the machine frame and rotatably supporting parallel upper and lower shafts, denoted 31 and 32, respectively, to be driven in opposite directions. A pulley 33 is fixed upon an end of the lower shaft 32 and situated exteriorly of the paper cutting unit 27, upper and lower gears 34 and 35, fixed upon said upper and lower shafts 31 and 32, respectively, and situated within a housing 36 upon the bearing member 30, are in mesh with each other, and a sprocket 37 fixed upon an end portion of the shaft 32 opposite the pulley 33 is disposed inwardly of and in adjacent relation to a lower annular die cutter 38 fixed upon said lower shaft 32 and adapted to cooperate with an upper annular die cutter 39, fixed upon the end of the upper shaft 31 at the same side of the bearing member 30, in a manner hereinafter to be set forth.

The paper cutting unit 27' includes a bearing member 40 mounted on the machine frame and rotatably supporting parallel, upper and lower shafts equivalent to the upper and lower shafts 31 and 32 of the bearing member 30, a sprocket (not shown) equivalent to the sprocket 37 is fixed upon an end portion of the lower shaft in the bearing member 40 inwardly of and in adjacent relation to a lower annular die cutter 41 fixed upon said lower shaft and adapted to cooperate with an upper annular die cutter 42 fixed upon an end of the upper shaft in said bearing member 40. The ends of the upper and lower shafts in the bearing member 40 opposite the ends having the lower and upper annular die cutters 41 and 42 fixedly support intermeshing gears (not shown), equivalent to the intermeshing gears 35 and 34, situated within a housing 43 upon the bearing member 40.

The electric motor 11 drives a transverse shaft 44 through the instrumentality of a first belt 45 riding a pulley on the motor shaft and a pulley 46 on said transverse shaft, and the pulley 33 is driven from the transverse shaft 44 through the instrumentality of a second belt 47 riding a pulley 48 on said transverse shaft and said pulley 33. The transverse shaft 44 is supported upon an arm 49 itself adjustably supported on the machine frame.

The chain drive 20 rides the sprocket 37 thus to be driven. The transverse shaft 18, fixedly supporting the lower feed roller 17 and driven by said chain drive 20, also fixedly supports a sprocket 50. A chain drive 51 rides the sprocket 50 and also rides a sprocket 52 fixed on the transverse shaft 29, and the lower shaft in the bearing member 40 is driven through the instrumentality of the sprocket (equivalent to the sprocket 37) fixed on the lower shaft and a chain drive 53 riding said last mentioned sprocket and also riding a sprocket 54 secured for rotatable adjustment upon the transverse shaft 29 in spaced relation to the sprocket 52 by a set screw 77.

The lower and upper annular die cutters 38 and 39 of the paper cutting unit 27 are complementary the one to the other, as are also the lower and upper annular die cutters 41 and 42 of the paper cutting unit 27'.

Complementary lower and upper annular die cutters equivalent to those of either the unit 27 or the unit 27' are disclosed in Fig. 8 as when operating upon a sheet of paper such as a file folder to provide a tab thereon.

The lower annular die cutter 38, equivalent to the lower annular die cutter 41, consists of a cylindrical shell 55 and an annular flange 56 at the base of said cylindrical shell extending interiorly thereof at right angular relation thereto. The end edge of the cylindrical shell 55 spaced from the base or annular flange 56 is cut away to provide a circumferentially extending knife edge 57 of irregular shape in the direction of its length at the exterior surface of said cylindrical shell 55. The upper annular die cutter 39, equivalent to the upper annular die cutter 42, consists of a cylindrical shell 58 and an annular flange 59 at the base of said cylindrical shell extending interiorly thereof at right angular relation thereto. The end edge of the cylindrical shell 58 spaced from the base or annular flange 59 is cut away to provide a circumferentially extending knife edge 60 of irregular shape in the direction of its length at the exterior surface of said cylindrical shell 58.

The angle pieces 13, 13 are for guiding a file folder, such as 61 in Fig. 8, with tab, such as 62, to be cut to lower and upper annular die cutters such as 38, 39 and 41, 42. The angle piece 13 at the side of the machine frame adjacent the paper cutting units 27 and 27' terminates just rearwardly of the lower and upper annular die cutters 38 and 39, and the construction and arrangement will be such that knife edges, such as 57 and 60, upon lower and upper annular die cutters will meet in the plane of file folders, such as 61, fed to said knife edges. The knife edge of each lower annular die cutter will bite into the lower surface while the knife edge of each upper annular die cutter bites into the upper surface of each file folder fed througfh the machine, and, together, the complementary knife edges will remove material from the file folders with a shearing action thus to produce tabs on the file folders. By employing more than one paper cutting unit, and spacing paper cutting units which are employed at desired distance apart, the production of multiple tabs of any desired configuration can be accomplished. The sprocket 54 is supported for rotational adjustment upon the transverse shaft 29 to the end that the knife edges of the annular die cutters of the unit 27' can be advanced or retarded with respect to the knife edges of the annular die cutters of the unit 27. It will be clear from Fig. 8 of the drawings that the shape and size of the tab or tabs produced on a file folder will depend upon the configuration of the complementary knife edges, such as 57 and 60, employed. Paper cutting units such as 27 and 27' can be utilized to produce separate cuts for providing a single tab.

The lower annular die cutter 38 is clamped upon the lower shaft 32 against an end thereof by a flat plate 63 and a bolt 64. The annular flange 56 is secured between the peripheries of said lower shaft 32 and said flat plate 63, and the bolt 64 passes centrally through the flat plate and enters the adjacent end of the lower shaft 32. The lower annular die cutter 41 is assembled with the lower shaft in the bearing member 40 in substantially the same manner the lower annular die cutter 38 is assembled with the lower shaft 32. The cylindrical shells of the lower annular die cutters 38 and 41 extend outwardly of the bases or annular flanges of said lower annular die cutters toward the bearing members.

The upper annular die cutter 39 is clamped upon the upper shaft 31 against an end thereof by a head member 65 and a bolt 66. The annular flange 59 is secured between peripheries of said upper shaft and said head member 65, and the bolt 66 passes through the head member and enters the adjacent end of the upper shaft 31. A rubber ring 67 surrounds a circular part of the head member, and an annular plate 68 is secured down against the rubber ring by screw bolts 69. The upper annular die cutter 42 is assembled with the upper shaft in the bearing member 40 in substantially the same manner the upper annular die cutter 39 is assembled with the upper shaft 31. The rubber ring 67 of the upper annular die cutter 39, and the equivalent rubber ring of the upper annular die cutter 42, engage upper surfaces of the file folders to cause them to be fed ahead. The cylindrical shells of the upper annular die cutters 39 and 42 extend inwardly of the bases or annular flanges of said upper annular die cutters away from the bearing members.

In order that the upper gear 34 of the unit 27 may be adjustable toward and away from and transversely of the lower gear 35 of said unit, the upper shaft 31 is mounted in a bearing element 72 itself eccentrically mounted in the bearing element 70 which in turn is mounted in the bearing member 30 for rotatable adjustment. An annular flange 78 upon an end of the bearing element 70, the left end in Fig. 6, includes an oblique surface engaged by an oblique surface of an annular element 79 in an annular depression in the adjacent surface of the bearing member 30, and screw bolt 80 in said bearing member and said annular element are for retaining the annular element 79 in fixed position relative to the bearing element 70. Rotatable adjustment of said bearing element will be accomplished while the screw bolts 80 are loosened, and tightening down of said screw bolts will cause the oblique surface of the annular element 79 to be pressingly engaged against the oblique surface of the annular flange 78 thus to cause the bearing element 70 to be secured in fixed position in the bearing member 30. The upper gear of the unit 27' desirably will be adjustable toward and away from and transversely of the lower gear of said unit in the same manner as the gear 34 is adjustable relative to the gear 35.

To the end that the lower and upper annular die cutters 38, 39 and 41, 42, respectively, can be adjusted to be in vertical alignment in a plane perpendicular to and extending transversely of the upper and lower shafts in the bearing members 30 and 40, respectively, said upper and lower shafts are mounted for longitudinal adjustment in the manner best disclosed in Fig. 6. See the relief slots 71 in the bearing elements 72 which receive the set screws 73 in the bearing elements 70. Each bearing element 72, together with the corresponding shaft as a unit, is capable of adjustment longitudinally of the corresponding bearing element 70, and can be fixed in said latter bearing element at any position to which longitudinally adjusted by turning down the set screws 73 in the relief slots 71.

In the instance of each of the paper cutting units 27 and 27', the lower and upper annular die cutters are placed on their holders in fixed positions, so that the complementary knife edges, such as 57 and 60, are accurately alined with respect to each other, by the employment of pins which enter openings such as 78 in the die cutters and are rigid with flanges on the upper and lower shafts in the bearing members of the cutting units.

It is to be understood that annular die cutters employed in the machine may be equipped to punch holes and/or to perforate, as well as to sever. Briefly stated, annular die cutters made according to the invention may be equipped to accomplish any form of cutting, perforating or punching.

The tab provided file folders are fed from the paper cutting units 27 and 27' to a conveyor belt 74 on a table 75 for receiving said file folders. An arm for retarding progress of the file folders as they are fed to or along the conveyor belt is indicated at 76.

What is claimed is:

1. In a machine of the character described, a bearing member, first upper and lower bearing elements, supported within said bearing member, one of said first bearing elements being mounted for rotatable adjustment, second upper and lower bearing elements supported within said first upper and lower bearing elements, respectively, for adjustment longitudinally thereof, one of the second bearing elements being eccentrically situated in the first bearing element which is rotatably adjustable, upper and lower parallel shafts rotatably mounted in said second upper and lower bearing elements, respectively, and each having first and second end portions extending beyond oppositely disposed sides, respectively, of said bearing members, means for rotating one of said parallel shafts, intermeshing gears fixed upon the first end portions of said upper and lower shafts, and complementary die cutters removably supported upon the second end portions of said upper and lower shafts.

2. In a machine of the character described, a bearing member, first upper and lower parallel bearing elements supported within said bearing member, one of said first bearing elements being rotatably adjustable, second upper and lower, parallel bearing elements supported within said first upper and lower bearing elements, respectively, for longitudinal adjustment, one of the second bearing elements being eccentrically situated in the first bearing element which is rotatably adjustable to be moved toward and away from the other second bearing element in response to rotation of said last mentioned first bearing element, upper and lower parallel shafts rotatably mounted in said second upper and lower bearing elements, respectively, and each having first and second end portions extending beyond oppositely disposed sides, respectively, of said bearing member, means for driving one of said parallel shafts, intermeshing gears fixed upon the first end portions of said upper and lower shafts at one side of said bearing member, a housing enclosing said intermeshing gears, and complementary die cutters removably supported upon the second end portions of said upper and lower shafts accessible at a side of the bearing member opposite said intermeshing gears.

3. In a machine of the character described, a pair of spaced, longitudinally alined bearing members, first upper and lower, parallel baring elements supported within each of said bearing members, one of the first bearing elements in each of the bearing members being mounted for rotatable adjustment, second upper and lower, parallel bearing elements supported within the first upper and lower bearing elements, respectively, in each of said bearing members for adjustment longitudinally thereof, one of the second bearing elements within the first bearing elements supported in each bearing member being eccentrically situated in the first bearing element which is rotatably adjustable, upper and lower parallel shafts rotatably mounted in the second upper and lower bearing elements, respectively, within the first upper and lower bearing elements supported in each bearing member, each of said upper and lower shafts having first and second end portions extending beyond oppositely disposed sides, respectively, of the corresponding bearing member, separate devices for rotating one of the parallel shafts mounted in the second upper and lower bearing elements within the first upper and lower bearing elements supported in each bearing member, intermeshing gears fixed upon the first end portions of the upper and lower shafts at one side of each of said bearing members, complementary die cutters removably supported upon the second end portions of the upper and lower shafts accessible at a side of each of the bearing members opposite the corresponding intermeshing gears, and unitary means for actuating said separate devices.

References Cited in the file of this patent

UNITED STATES PATENTS

| | | | |
|---|---|---|---|
| Re. 20,492 | Yoder | | Aug. 31, 1937 |
| 432,564 | Ritchie | | July 22, 1890 |
| 801,916 | Rudolphi | | Oct. 17, 1905 |
| 815,491 | Tschantz | | Mar. 20, 1906 |
| 934,090 | McLean | | Sept. 4, 1909 |
| 1,172,831 | Porter | | Feb. 22, 1916 |
| 1,244,654 | Spiegel | | Oct. 30, 1917 |
| 1,274,623 | Spiegel | | Aug. 6, 1918 |
| 1,433,138 | Kruse | | Oct. 24, 1922 |
| 1,678,458 | Biggert | | July 24, 1928 |
| 1,819,635 | Biggert et al. | | Aug. 18, 1931 |
| 1,831,660 | Hancock | | Nov. 10, 1931 |
| 1,984,737 | Gerster | | Dec. 18, 1934 |
| 2,215,302 | Sigoda | | Sept. 17, 1940 |
| 2,539,401 | Earl et al. | | Jan. 30, 1951 |
| 2,619,175 | Gottlieb | | Nov. 25, 1952 |
| 2,670,796 | Orr | | Mar. 2, 1954 |
| 2,696,255 | Heywood | | Dec. 7, 1954 |

FOREIGN PATENTS

| | | |
|---|---|---|
| 449,862 | Germany | Sept. 28, 1927 |